US008957965B2

(12) United States Patent
Moribe et al.

(10) Patent No.: US 8,957,965 B2
(45) Date of Patent: Feb. 17, 2015

(54) SYSTEM, SYSTEM CONSTRUCTION METHOD, MANAGING TERMINAL AND PROGRAM

(75) Inventors: Hirotaka Moribe, Yokohama (JP); Shinsuke Terada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 964 days.

(21) Appl. No.: 12/961,748

(22) Filed: Dec. 7, 2010

(65) Prior Publication Data

US 2011/0134256 A1    Jun. 9, 2011

(30) Foreign Application Priority Data

Dec. 7, 2009  (JP) .................................. 2009-277140

(51) Int. Cl.
| H04N 7/18 | (2006.01) |
| H03D 3/24 | (2006.01) |
| H04N 7/12 | (2006.01) |
| H04N 11/02 | (2006.01) |
| H04N 11/04 | (2006.01) |
| H04L 12/28 | (2006.01) |
| H04J 3/16 | (2006.01) |
| H04J 3/22 | (2006.01) |

(52) U.S. Cl.
CPC ..................................... H04N 7/181 (2013.01)
USPC ...... 348/143; 375/376; 375/240.28; 370/389; 370/468

(58) Field of Classification Search
USPC .............................................. 348/143, 207.1
See application file for complete search history.

(56) References Cited

U.S. PATENT DOCUMENTS

| 2007/0070185 | A1 | 3/2007 | Dy et al. |
| 2008/0120122 | A1 | 5/2008 | Olenski et al. |
| 2008/0309762 | A1 | 12/2008 | Howard et al. |
| 2009/0268030 | A1 | 10/2009 | Markham |

FOREIGN PATENT DOCUMENTS

| JP | 10-285585 | * 10/1998 | ............... H04N 7/18 |
| JP | 2006-292611 | 10/2006 | |
| WO | WO 2008/114088 | * 9/2008 | |

OTHER PUBLICATIONS

R. Droms, Dynamic Host Configuration Protocol, Network working Group, Mar. 1997.

* cited by examiner

*Primary Examiner* — Hee-Yong Kim
(74) *Attorney, Agent, or Firm* — Antonelli, Terry, Stout & Kraus, LLP.

(57) ABSTRACT

A system includes a managing terminal, a mobile device, and cameras. The mobile device sends, when it is near one of the cameras, positional information of the mobile device and a uniquely created identifier via a network to the managing terminal and displays information indicating the identifier in the form of a video image. The camera shoots the video image being displayed by the mobile device and including the information indicating the identifier to create a second video image including the information and sends the second video image via a network to the managing terminal. The managing terminal receives the second video image, extracts the identifier therefrom, and stores, if the identifier matches the identifier sent from the mobile device, the IP address assigned to the camera and the positional information with a correspondence established therebetween.

12 Claims, 7 Drawing Sheets

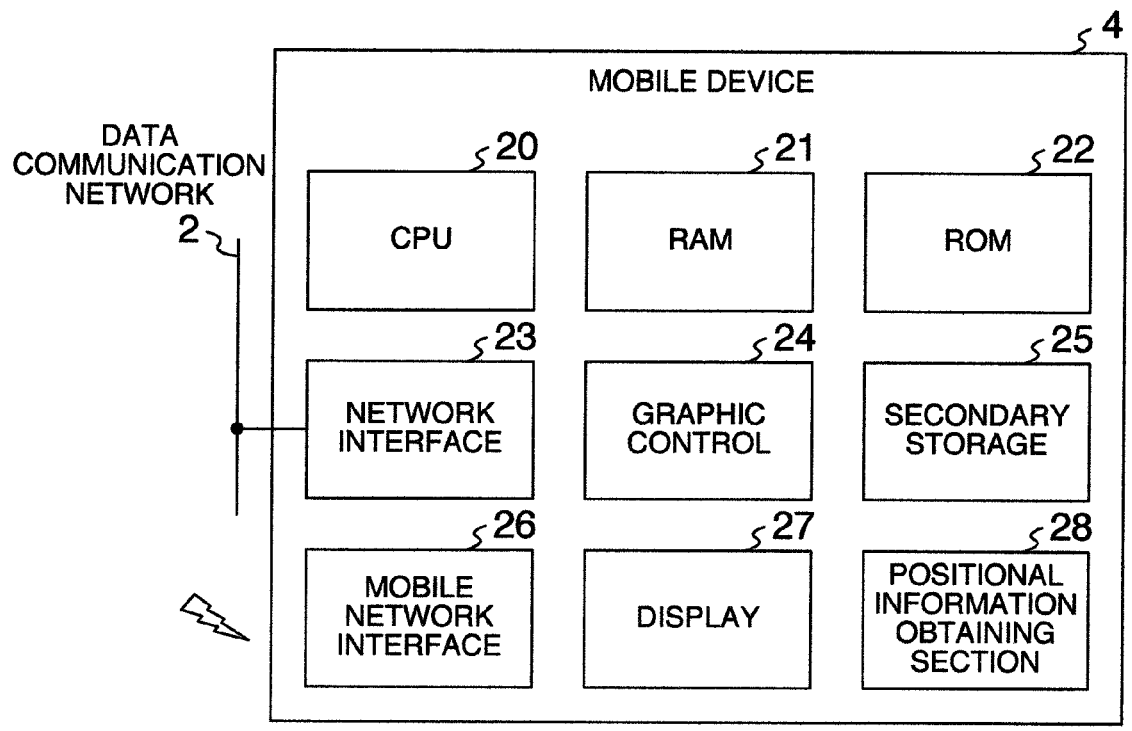
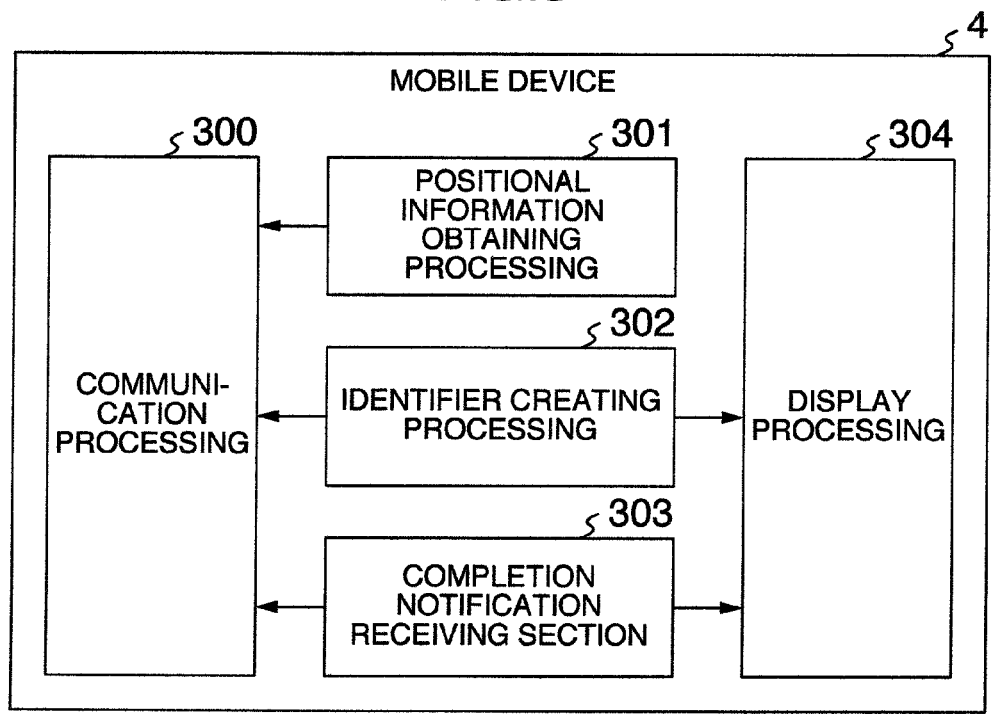

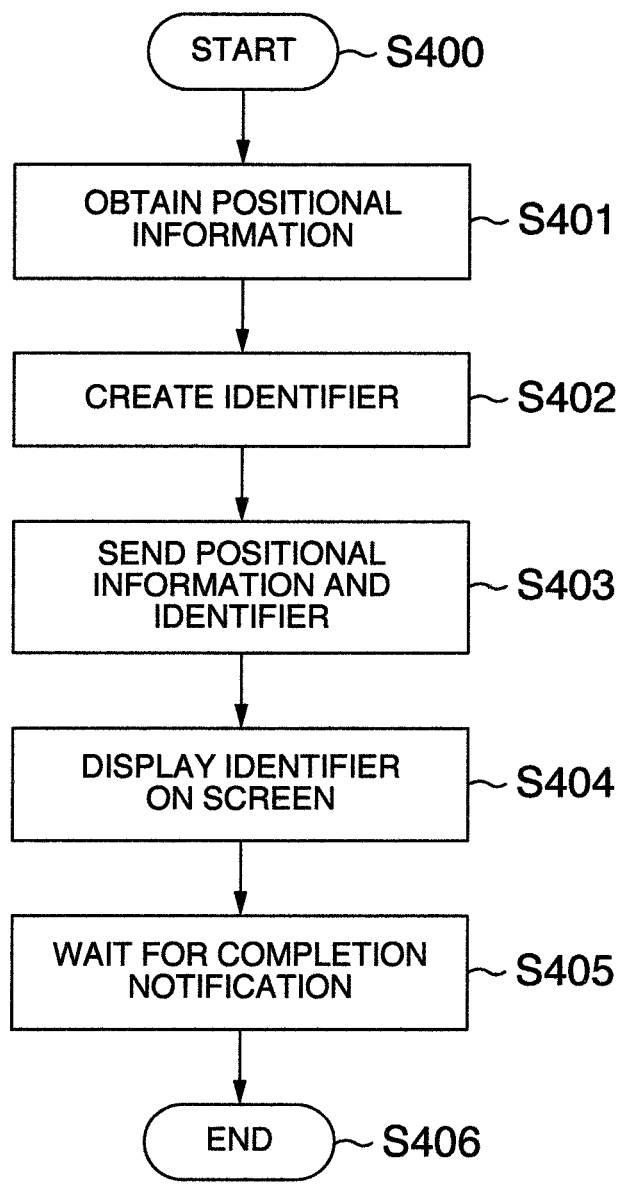

FIG.9

| | IP ADDRESS INFORMATION | IDENTIFIER INFORMATION | POSITIONAL INFORMATION |
|---|---|---|---|
| 1 | 192.168.11.4 | ca23sa52jfaw | 139.616866666667 35.462808333333 |
| 2 | 192.168.11.8 | em48wl20pels | 139.616768333333 35.46292 |
| 3 | 192.168.11.12 | ee01gu47eycl | 139.617115 35.4626466666667 |
| 4 | | ot56le95uyel | 139.617523333333 35.462435 |
| | | | |

SYSTEM, SYSTEM CONSTRUCTION METHOD, MANAGING TERMINAL AND PROGRAM

INCORPORATION BY REFERENCE

The present application claims priority from Japanese application JP2009-277140 filed on Dec. 7, 2009, the content of which is hereby incorporated by reference into this application.

BACKGROUND OF THE INVENTION

The present invention relates to a system, a system construction method, a managing terminal and a program, and in particular, to techniques for a system, a system construction method, a managing terminal, and a program employing a monitor camera.

There exists a monitor camera for use with an Internet Protocol (IP) network in which a video image of the monitor camera can be referred to or viewed via the IP network from, for example, a remote monitor center. Some of such monitor cameras include a Plug&Play function or a plug and play function which serves various functions as follows. For example, it is possible to detect a monitor camera via a network. Information pieces of the monitor camera can be collected, operated or processed. It is also possible to refer to video images of the information pieces of the monitor camera.

To execute such functions, it is first required to set an appropriate IP address to the monitor camera. An IP address can be set to the camera in a static address setting method or a dynamic address setting method. In the static address setting, an installation operator manually sets an IP address without duplication to a monitor camera operable for an IP network at a position where the monitor camera is installed. Or, for example, a manager beforehand sets an IP address without duplication to a monitor camera operable for an IP network. In the dynamic address setting operation using, for example, Dynamic Host Configuration Protocol (DHCP; Dynamic Host Configuration Protocol, March 1997, RFC2131), when a monitor camera operable for an IP network including a DHCP client function is coupled with a network, a DHCP server installed by the manager side assigns an IP address to the monitor camera. DHCP is a protocol for automatically allocating an IP address to a computer connected to a network such as the internet.

When the installation operator conducts the static address setting of an IP address at the installation position, it is required that the installation operator has expert knowledge for the operation. This also requires a period of time and labor. When the manager beforehand conducts the static address setting of an IP address, it is required after an IP address is set to the monitor camera without duplication that the manager informs the installation operator of a correct installation position and an IP address corresponding thereto. The installation operator installs the monitor camera at the beforehand determined place while confirming the IP address of the monitor camera.

In the dynamic address setting by use of, for example, DHCP, it is not required to beforehand set any data item to the monitor camera. The installation operator can install a desired monitor camera at an appropriate installation position. However, after the monitor camera is installed, the correspondence between the installation position of the monitor camera and the IP address assigned by, for example, DHCP is unknown to the manager side. Since the IP address is not known, the manager side cannot determine a monitor camera as a target for conducting an operation and for referring to a video image. This leads to difficulties in the operation.

To overcome the difficulties, patent JP-A-10-285585 describes a method using a monitor camera including a function to obtain information of a position of its own. When such monitor camera is installed at one of the specified monitor camera installation positions, information of the position and an identifier (ID) of the monitor camera are sent to the manager side. As a result, it is possible for the manager to obtain the monitor camera installation position and the identifier to refer to a video image of the monitor camera.

SUMMARY OF THE INVENTION

However, according to the technique described in the document above, it is required for the camera to include the function to obtain information of its position. This results in a problem of increase in the cost of the camera.

In consideration of the problem above, a system, a system construction method, a managing terminal, and a program in which an IP address set to a camera and an installation position of the camera can be correctly and easily obtained are disclosed.

The disclosed system provides a system including a managing terminal, a portable or mobile device coupled via a network with the managing terminal, and cameras coupled via a network with the managing terminal. The mobile device sends, when the mobile device is near one of the cameras, positional information of the mobile device and an identifier uniquely created by the mobile device via the network to the managing terminal and displays information indicating the identifier in the form of a video image. The camera shoots the video image being displayed by the mobile device and including the information indicating the identifier to create a second video image including the information and sends the second video image via the network to the managing terminal. The managing terminal receives the second video image sent from the camera, extracts the identifier from the second video image, and stores, if the identifier matches the identifier sent from the mobile device, the IP address assigned to the camera and the positional information with a correspondence established therebetween.

By use of a monitor camera according to the teaching herein, an IP address set to a camera and an installation position of the camera can be correctly and easily obtained.

Other objects, features and advantages of the invention will become apparent from the following description of the embodiments of the invention taken in conjunction with the accompanying drawings.

BRIEF DESCRIPTION OF THE DRAWINGS

FIG. 2 is a schematic diagram showing a hardware configuration of a mobile device 4 in the embodiment;

FIG. 3 is a functional block diagram of the mobile device 4;

FIG. 4 is a flowchart showing a flow of processing to be executed by the mobile device 4;

FIG. 9 is a schematic diagram showing an information managing table 90.

DESCRIPTION OF THE EMBODIMENTS

Description of the monitor camera system 1 will now be given as an example.

Figure 1:
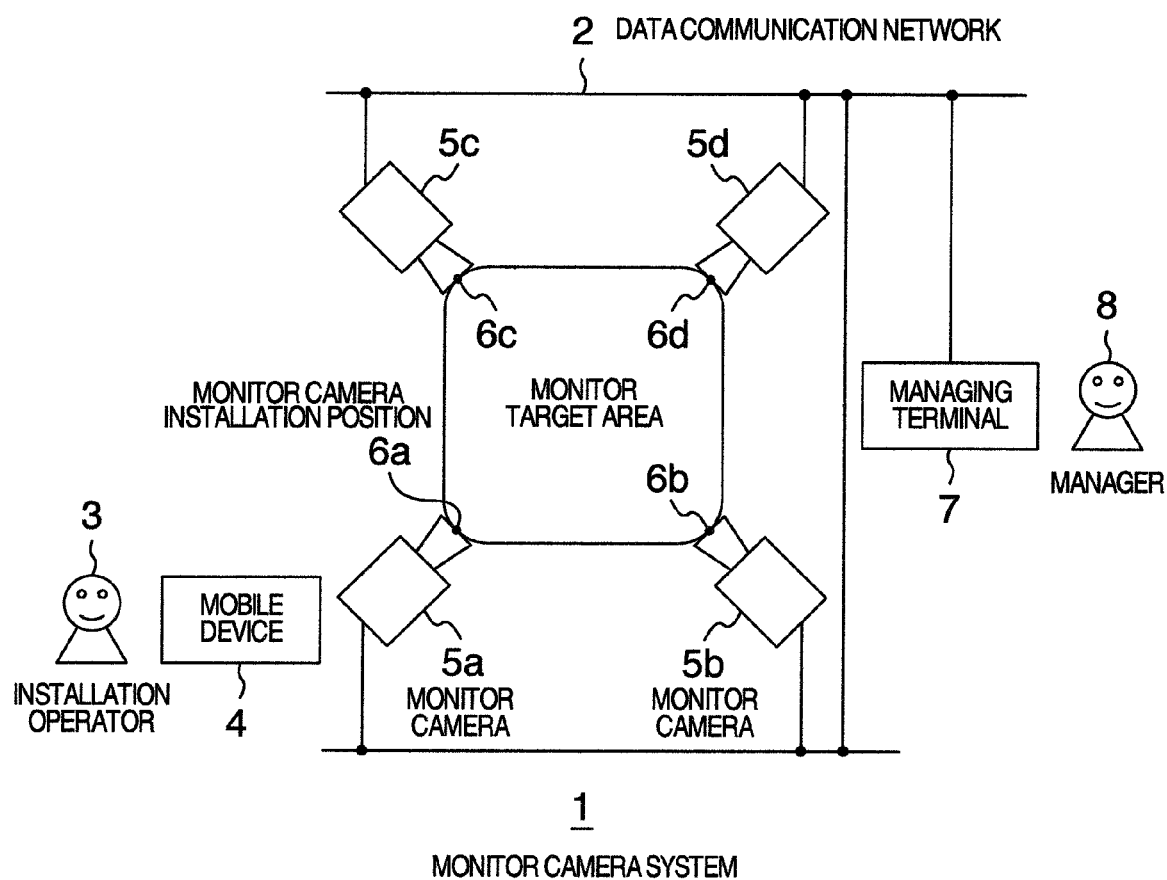
FIG. 1 is a block diagram showing a configuration of a monitor camera system 1 in an embodiment.

System Configuration:

FIG. 1 shows an example of structure of the monitor camera system 1.

The monitor camera system 1 includes a data communication network or data network 2, an installation operator 3, a portable or mobile device 4, monitor cameras 5, monitor camera installation positions 6, a managing terminal 7, and a manager 8. Each of the monitor cameras 5 is installed at an associated one of the monitor camera installation positions 6 and is coupled with the data network 2 to be mutually communicable via the data network 2 with the managing terminal 7.

The data network 2 includes, for example, a portable telephone or cellular network, a Local Area Network (LAN) to conduct communication by radio and by wire, and/or the Internet including LANs coupled with each other.

The installation operator 3 has the mobile device 4 and installs a desired one of the monitor cameras 5 at an associated one of the beforehand scheduled installation positions 6.

The mobile device 4 is communicable by radio or by wire via the data network 2 or another network with the managing terminal 7. The mobile device 4 is, for example, a cellular, a Personal Digital Assistant (PDA), or a high portability personal computer.

The monitor camera 5 can be coupled by radio or by wire with the data network 2. The monitor camera 5 includes, for example, a dynamic address setting function of a DHCP client and a plug and play function including a device search protocol function to detect a monitor camera, a function to supply device information of the monitor camera, a function to conduct various operations, and a function to deliver video images.

Each of the monitor camera installation positions 6 is a beforehand scheduled position at which an associated monitor camera 5 is installed for a monitor target area.

The managing terminal 7 includes a function to use the plug and play function of each monitor camera 5 to obtain an IP address of the monitor camera 5 via the data network 2 according to the device search protocol to detect a monitor camera by using, for example, a multicast function. The managing terminal 7 can obtain device information of the monitor camera 5 assigned with the obtained IP address to conduct various operations for the monitor camera. Also, the managing terminal 7 can receive a video image from the monitor camera 5 to display the video image on a screen. In addition, the managing terminal 7 includes a function of a DHCP server to assign an IP address to the monitor camera 5 including the DHCP client function. The managing terminal 7 includes one device or a plurality of devices and is, for example, a personal computer, a server device, or a system including a settop box and a monitor.

The manager 8 supervises the overall operation of the monitor camera system 1. At least one manager or monitor operator operates each monitor camera 5 and refers to a video image sent therefrom.

FIG. 2 shows a hardware configuration of the mobile device 4. The mobile device 4 includes a Central Processing Unit (CPU) 20 to control the entire operation of the mobile device 4, a Random Access Memory (RAM) 21 and a Read Only Memory (ROM) 22 which store data and programs, a network interface 23 to communicate data with the data network 2, a graphic control section 24 to control operation to display information on a display 27 coupled with the mobile device 4, a secondary storage 25 capable of storing data therein and deleting data therefrom, a cellular network interface 26 to be coupled with to a cellular network to be coupled via the cellular network with the managing terminal, a display 27 to display various information pieces on a screen, and a positional information obtaining section 28 capable of obtaining information of its own position by use of, for example, the Global Positioning System (GPS). According to configuration modes of the mobile device 4, the secondary storage 25 may be a Hard Disk Drive (HDD), a Solid State Drive (SSD), or the like, and the cellular network interface 26 may be dispensed with depending on cases.

FIG. 3 shows functional blocks of the mobile device 4. The mobile device 4 includes a communication processing section 300, a positional information obtaining processing section 301, an identifier creating processing section 302, a completion notification receiving section 303, and a display processing section 304. When the mobile device 4 is coupled via the data network 2 with the managing terminal 7 by use of the network interface 23 and the mobile network interface 26 of the mobile device 4, the communication section 300 communicates data between the mobile device 4 and the managing terminal 7. Also, the communication section 300 establishes a correspondence between information passed from the positional information obtaining section 301, which will be described later, and information passed from the identifier creating section 302, which will be described later. The communication section 300 then transmits the information pieces with the correspondence established therebetween to the managing terminal 7.

The positional information obtaining section 301 obtains positional information of the position of the mobile device 4, the positional information being acquired by a positional information obtaining section 28 of the mobile device 4, and then passes the positional information to the communication section 300.

The identifier creating section 302 can create a unique identifier without duplication. The identifier is, for example, a string of numerals, a string of characters, a bar code, a two-dimensional bar code, or a pattern. The identifier may be created based on the positional information obtained by the positional information obtaining section 301. The identifier may include the positional information in a restorable or non-restorable state. The created identifier is transferred to the communication section 300 and the display section 304, which will be described later.

When the communication section 300 receives a completion notification via the data network 2 from the managing terminal 7 by use of the network interface 23 and the cellular network interface 26 of the mobile device 4, the completion notification receiving section 303 instructs the display control section 304, which will be described later, to display the completion of the processing, to thereby terminate each associated processing.

The display control section 304 displays the identifier received from the identifier creating section 302 on a screen. At reception of a processing termination notification from the completion notification receiving section 303, the display control section 304 terminates the displaying of the identifier and notifies the processing termination to the installation operator 3, for example, through a screen or by use of a sound.

The processing sections 300 to 304 are implemented when the CPU 20 executes programs, which are read from the secondary storage 25 and the ROM 22 to be loaded in the RAM 21, by using the functions of the network interface 23, the cellular network interface 26, the graphic control section 24, and the positional information obtaining section 28. Also, processing of the mobile device 4, which will be described later in conjunction with the drawings, is implemented when the CPU 20 reads required programs to appropriately conduct control for the respective processing sections.

Figure 7:
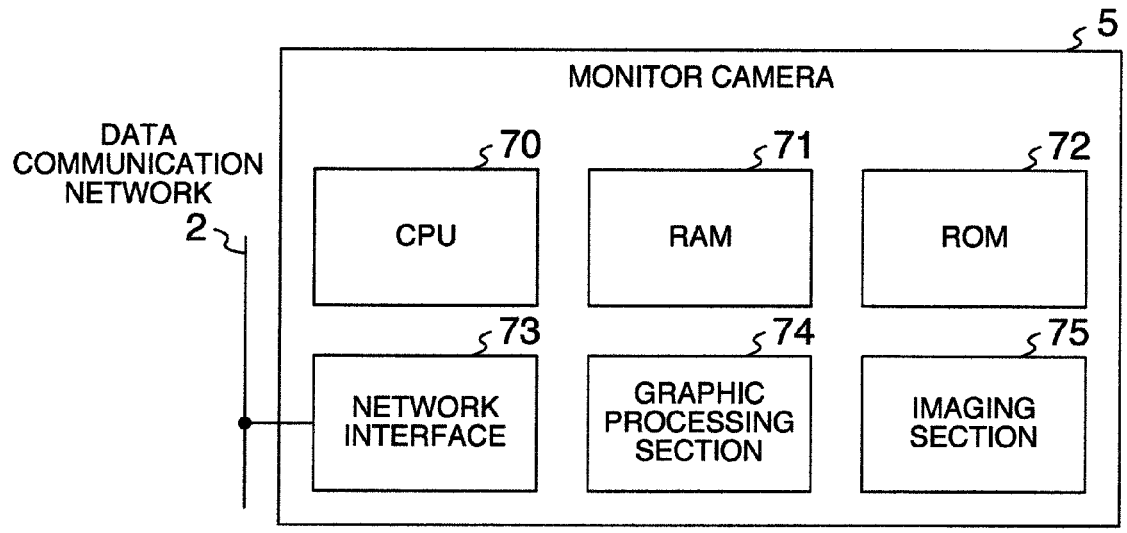
FIG. 7 is a block diagram showing functions of the monitor camera 5.

FIG. 7 shows functional blocks of the monitor camera 5. The monitor camera 5 includes a CPU 70 to entirely supervise operation of the monitor camera 5, an RAM 71 and an ROM 72 which store data and programs therein, a network interface 73 to communicate data with the data network 2, a graphic processing section 74 to convert signals including video signals received from an imaging section 75, which will be described later, into digital data to execute various data processing, and an imaging section 75 which produces an image signal by image pickup device from an external video image obtained by an optical system. According to configuration modes of the monitor camera 5, there may be disposed, for example, a secondary storage which can record data therein and which can delete data therefrom. The ROM 72 of the monitor camera 5 includes a program for a plug and play function which executes processing up to the video delivery to the managing terminal 7 without requiring any particular setting operation. The ROM 72 also includes a program for a DHCP client function which can obtain an IP address from a DHCP server to assign the IP address to the monitor camera 5. These functions are implemented when the CPU 70 executes associated programs loaded in the RAM 71. In addition, processing of the monitor camera 5, which will be described later in conjunction with the drawings, is similarly implemented when the CPU 70 reads out required programs to appropriately conduct control for the associated processing sections.

Figure 8:
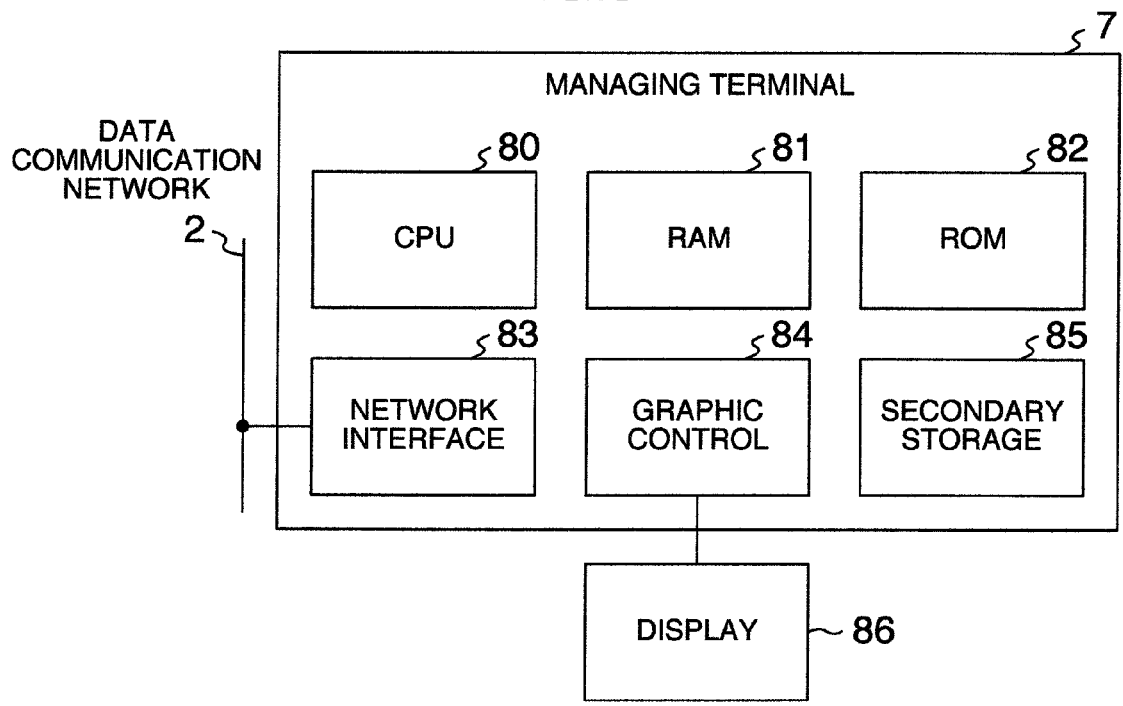
FIG. 8 is a functional block diagram of the managing terminal 7.

FIG. 8 shows functional blocks of the managing terminal 7. The managing terminal 7 includes a CPU 80 to entirely supervise operation of the managing terminal 7, an RAM 81 and an ROM 82 which store data and programs therein, a network interface 83 to communicate data with the data network 2, a graphic control section 84 which conducts control to display information on a display section 86 coupled with the managing terminal 7, and a secondary storage 85 capable of storing data therein and deleting data therefrom. A display section 86 to display various information pieces on a screen is coupled with the managing terminal 7. The secondary storage 85 of the managing terminal 7 includes a program for a plug and play function to execute processing ranging from the coupling with the monitor camera 5 up to the receiving of a video image therefrom without requiring any particular setting operation. The secondary storage 85 also includes a program for a DHCP server function to assign an appropriate IP address to a DHCP client. These functions are implemented when the CPU 80 executes associated programs loaded in the RAM 81. Also, the secondary storage 85 have recorded an information managing table 90, which will be described later, to save the table 90 therein. Additionally, processing of the managing terminal 7, which will be described later in conjunction with the drawings, is similarly implemented when the CPU 80 reads required programs to appropriately conduct control for the respective processing sections.

FIG. 9 shows the information managing table 90 recorded in the secondary storage 85 to be saved therein. The information managing table 90 includes an identifier information field 92 and a positional information field 93 to respectively store a unique identifier of each of the mobile terminals 5 and positional information thereof. The managing terminal 7 can obtain the unique identifier and the positional information of the information managing table 90 via the data network from the mobile terminal 5. The information managing table 90 also includes an IP address information field 91 to record therein the IP address of the mobile terminal 5, the IP address being obtained through processing executed between the mobile terminal 5 and the managing terminal 7. In the identifier information field 92, information of the identifier may be directly recorded or information of, for example, a directory or a file name to refer to the information of the identifier may be recorded. In the positional information field 93, positional information sent from the mobile terminal 5 is recorded, for example, as a pair of latitude and longitude.

System Processing:

Next, description will be given in detail of processing in the mobile device 4 and the managing terminal 7 according to the present embodiment. This will clarify a method for the managing terminal 7 to obtain the correspondence between the positional information of the monitor camera 5 and the IP address assigned thereto.

Mobile Device Processing:

FIG. 4 shows a flow of mobile device processing 400 of the mobile device 4 in association with operation of the installation operator 3. Specifically, positional information and a created identifier of the mobile device 4 are notified via the data network 2 to the managing terminal 7. After the monitor camera 5 is installed at the installation position 6 and is then activated, the mobile device processing 400 is executed in the mobile device 4 placed just near a lens of the monitor camera 5.

In step S401, the positional information obtaining section 301 obtains information of the current position of the mobile device 4 by use of the positional information obtaining section 28 to pass the positional information to the communication section 300. Control goes to step S402.

In step S402, the identifier information creating section 302 creates a unique identifier without duplication, the identifier being, for example, a string of numerals, a string of characters, a bar code, or a two-dimensional bar code, to pass information of the created identifier to the display section 304 and the communication section 300. Control goes to step S403. In the creation of the identifier, by use of the positional information obtained by the positional information obtaining section 301 in step S401, the unique identifier may be created in a restorable or non-restorable state.

In step S403, the communication section 300 sends the positional information and the information of the created unique identifier respectively sent from the positional information obtaining section 301 and the identifier information creating section 302 respectively in steps S401 and S402, via the data network 2 to the managing terminal 7 by using the network interface 23 and the cellular network interface 26. The positional information and the information of the created unique identifier are in the form in which a correspondence can be established therebetween. Control goes to step S404.

In step S404, the display section 304 displays the unique identifier created in step S402 on the display 27 by use of the graphic control section 24 and then control goes to step S405. After confirming the identifier displayed on the display 27, the installation operator 3 presents the display 27 to the lens of the monitor camera 5 installed as above.

In step S405, the completion notification receiving section 303 waits for an event in which the managing terminal 7 sends a completion notification via the data network 2 to the network interface 23 and the mobile network interface 26 and then the communication section 300 receives the completion notification. When the completion notification is received, the completion notification receiving section 303 urges the display control section 304 to display the completion of processing, to thereby terminate the processing.

Description has been given of a flow of the processing in which the mobile device 4 sends the positional information of the monitor camera 5 installed at the monitor camera installation position 6 and the information of the created unique identifier via the data network 2 to the managing terminal 7.

Figure 5:
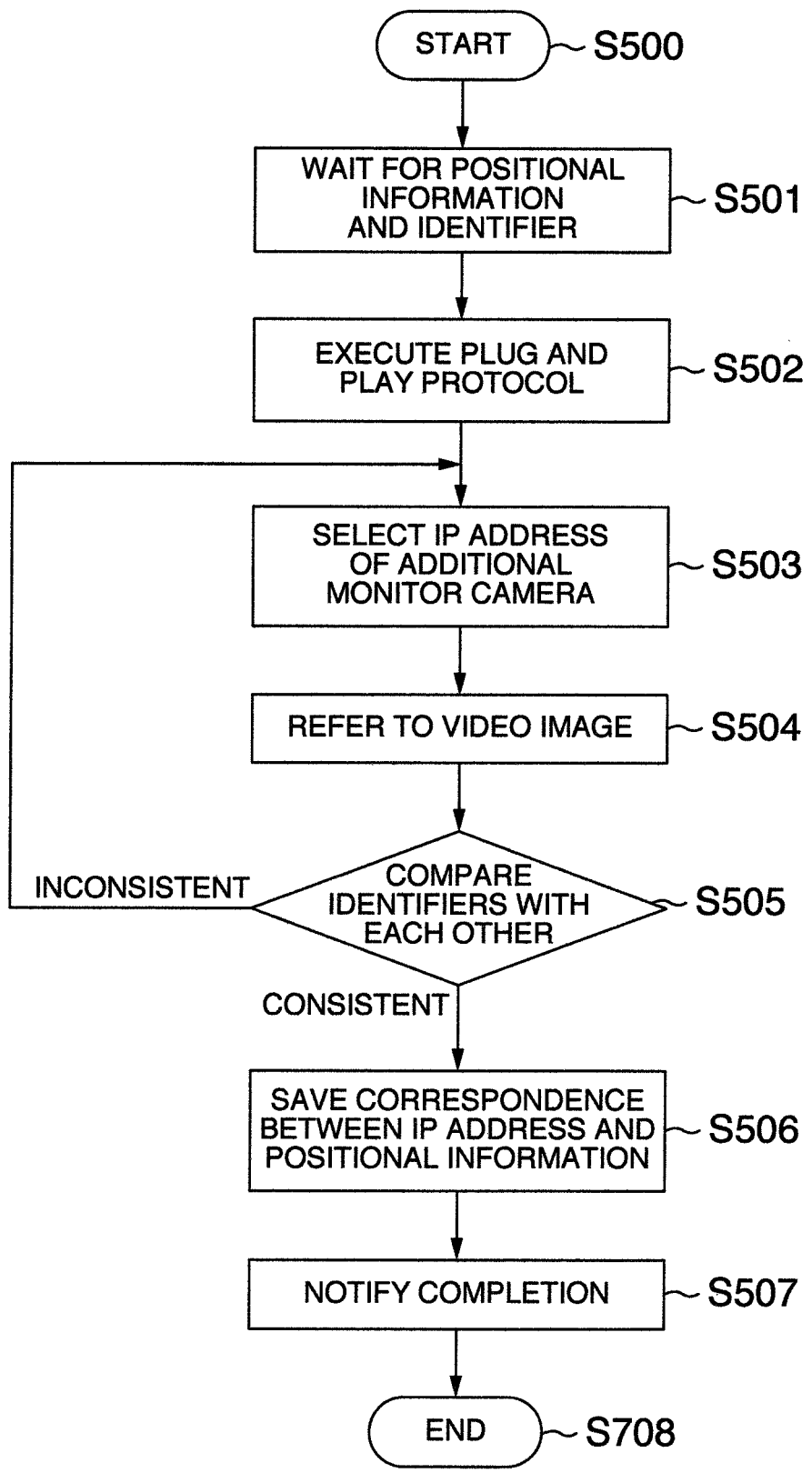
FIG. 5 is a flowchart showing a flow of processing to be executed by a managing terminal 7 in the embodiment.
Figure 6:
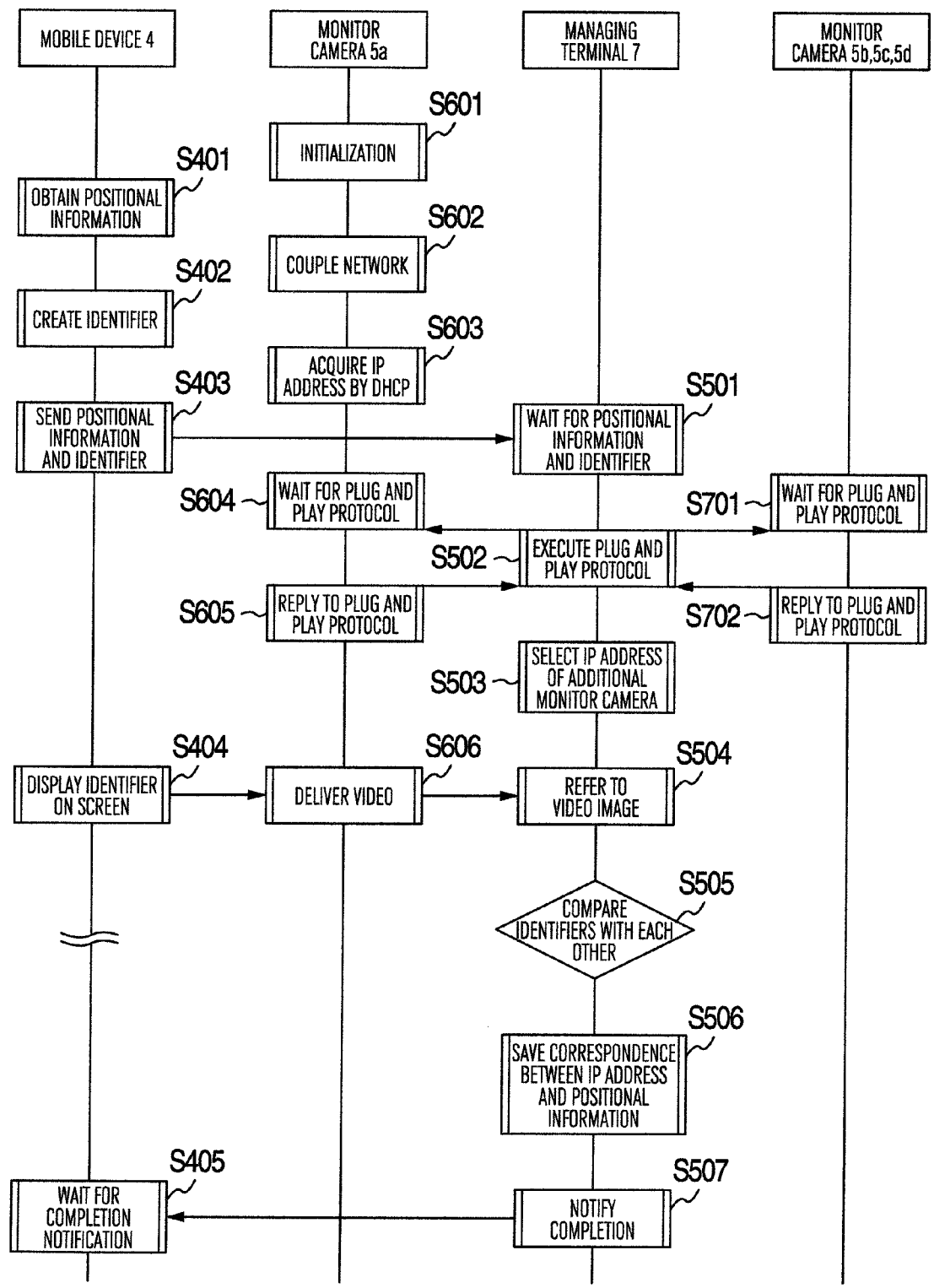
FIG. 6 is an interaction diagram showing communications and flows of processing to be executed between the mobile device 4, monitor cameras 5, and the managing terminal 7 in a particular situation of the monitor camera system 1.

Managing Terminal Processing:

FIG. 5 shows a flow of managing terminal processing 500 of the managing terminal 7. Specifically, at one of the monitor camera installation positions 6, a mobile device 4 sends positional information and unique identifier information via the data network 2 to the managing terminal 7. When the positional information and the unique identifier information are received, the managing terminal processing 500 establishes, by use of a video image delivered from the monitor camera 5 installed at the installation position 6, a correspondence between the IP address of the monitor camera 5 and the positional information of the installation position 6 of the monitor camera 5.

In step S501, the managing terminal 7 receives the positional information and the identifier information via the data network 2 from the communication section 300 of the mobile device 4. The managing terminal 7 then records and saves these information pieces in the form of the information managing table 90 shown in FIG. 9. Control goes to step S502.

In step S502, the managing terminal 7 executes the plug and play protocol to obtain an IP address of each monitor camera 5. In the processing of the plug and play protocol, the managing terminal 7 broadcasts an inquiry via the data network 2 by use of, for example, a multicasting function to receive a reply from each monitor camera 5. At reception of the reply, the managing terminal 7 obtains an IP address of the associated monitor camera 5 and then control goes to step S503. By further conducting the plug and play protocol, the managing terminal 7 issues an inquiry to each of the monitor cameras 5 using the associated IP address to obtain information of the various kinds of devices including a delivery IP address and a port to receive a video image delivered from the monitor camera 5.

In step S503, from the IP addresses, obtained in step S502, of the monitor cameras 5 coupled with the data network 2, the managing terminal 7 selects an IP address of the monitor camera 5 newly coupled with the data network 2. Control goes to step S504.

In step S504, the managing terminal 7 couples with the monitor camera 5 having the IP address selected in step S503 to refer to a video image of the monitor camera 5. Control goes to step S505.

In step S504, the managing terminal 7 makes a check to determine, by a graphic processing function of the managing terminal 7, whether or not the video image of step S504 includes the identifier received in step S501. This operation may be visually conducted by the manager 8 who is operating the managing terminal 7. If the identifier is included, control goes to step S506; otherwise, control goes to step S503.

As described for step S404 of FIG. 4, when the display 27 of the mobile device 4 is placed in front of the monitor camera 5 to be presented to the lens thereof, the unique identifier displayed on the display 27 is in the form of a string of numerals, a string of characters, a bar code, or a two-dimensional bar code. It is hence possible to determine whether or not the identifier is included in the video image by use of a known image processing method. The image processing method is, for example, an Optical Character Recognition (OCR) technique if the identifier is a string of numerals or a string of characters; or, an Optical Mark Recognition (OMR) technique if the identifier is a bar code or a two-dimensional bar code.

In step S505, if the identifier received in step S501 matches that extracted from the video image in step S505, control goes to step S506. Otherwise, control goes to step S503.

In step S506, the managing terminal 7 establishes a correspondence between the IP address selected in step S503 and the positional information which is received in step S501 and which corresponds to the identifier included in the video image used in step S505. The managing terminal 7 records and saves the data items with the correspondence therebetween in the information managing table 90 shown in FIG. 9 and then goes to step S507. In short, that the identifier received in step S501 matches the identifier extracted from the video image in step S505 apparently indicates that the IP address sent from the monitor camera 5 installed as a new unit appropriately corresponds to the positional information sent from the mobile device 4. In step S507, the managing terminal 7 notifies a termination message indicating termination of the managing terminal processing via the data network 2 and the communication section 300 of the mobile terminal 4 to the completion notification receiving section 303, to thereby terminate the managing terminal processing.

Description has been given of a flow of the processing in which by use of a pair of the positional information and the identifier information received from the mobile device 4 and a video image of the identifier included in the video image delivered from the monitor camera 5, the managing terminal 7 establishes a correspondence between the IP address and the positional information of the monitor camera 5. According to the embodiment, the installation operator can install a desired monitor camera at a desired installation position without conducting, for example, any address setting operation. The manager side can easily obtain a correspondence between the IP address assigned to the monitor camera and the installation position thereof. It is easily possible to construct a monitor camera system, to update the monitor camera system, to additionally construct a monitor camera system, and to expand the monitor camera system.

Specific Example of System Processing:

Referring now to FIGS. 1, 4, 5, and 6, description will be given of a specific example of the processing in which the managing terminal 7 establishes a correspondence between the IP address and the positional information of the monitor camera 5. The mobile terminal 4 sends positional information of a mobile device 4 existing at a monitor camera installation position 6 and a unique identifier created by the mobile device 4 via the data network 2 to the managing terminal 7. The monitor camera 5 produces a video image presenting the unique identifier displayed on a screen of the mobile device 4. By delivering the video image to the managing terminal 7, it is possible for the managing terminal 7 to compare the identifier sent from the mobile device 4 with the identifier included in the video image delivered from the monitor camera 5. As a result, the managing terminal 7 establishes a correspondence between the IP address of the monitor camera 5 and the positional information of the monitor camera 5 installed at the installation position 6.

It is assumed that the monitor camera system 1 of this example is constructed as follows. The monitor cameras 5b and 5c are beforehand installed respectively at the installation positions 6b and 6c. The managing terminal 7 knows a correspondence between the IP addresses of the monitor cameras 5b to 5d and the installation positions 6b to 6d, respectively. The installation operator 3 installs the monitor camera 5a at the installation position 6a. Description will be given of a flow of processing beginning at a point of time when the installation operator 3 conducts a physical installation operation for the monitor camera 5a.

New Monitor Camera Installation Operation:

The installation operator 3 brings a particular monitor camera 5 to the installation position 6a beforehand scheduled in the designing phase to install the monitor camera 5 on, for example, a camera stand. When the monitor camera 5 is wired to a power source cable and the data network 2, the installation operator 3 uses an appropriate cable such as a network cable. The monitor camera 5 completely installed at the installation position 6a will be referred to as a monitor camera 5a hereinbelow.

When powered, the monitor camera 5a executes initialization processing in step S601. Control goes to step S602.

In step 5602, the monitor camera 5a is electrically or physically coupled by radio or by wire with the data network 2, and then control goes to step S603.

In step S603, the monitor camera 5a obtains an IP address to set the IP address as its own IP address by, for example, the DHCP client function. Control goes to step S604.

In step S604, the monitor camera 5a waits for reception of an inquiry based on the plug and play protocol. At reception of an inquiry based on the plug and play protocol from, for example, the managing terminal 7, control goes to step S605.

Operation to Present Mobile Device Identifier Display Screen:

The installation operator 3 powers the monitor camera 5a and then operates the mobile device 4 at the installation position 6a where the monitor camera 5a has been installed to thereby indicate the mobile device 4 to execute the mobile device processing 400.

In step S401, the mobile device 4 obtains the positional information of the installation position 6a where the mobile device 4 exists. Control goes to step S402.

In step S402, the mobile device 4 creates a unique identifier in the form of a string of numerals, a string of characters, a bar code, or a two-dimensional bar code. Control goes to step S403.

In step S403, the mobile device 4 sends the positional information obtained in step S401 and information of the identifier created in step S402 via the data network 2 to the managing terminal 7. Control goes to step S404.

In step S404, the mobile device 4 displays the identifier created in step S402 on the screen thereof and transfers control to step S405 with the identifier kept displayed on the screen.

The installation operator 3 confirms that the identifier is displayed on the screen of the mobile device 4 and then presents the screen to the lens of the monitor camera 5a.

Monitor Camera System Cooperative Processing:

In step S501, the managing terminal 7 waits for an event in which the positional information of the mobile device 4 and the unique identifier information created by the mobile device 4, which are sent from the mobile device 4 in step S403, are received. At reception of data items of these information pieces, control goes to step S502.

In step S502, the managing terminal 7 executes the plug and play protocol processing for the data network 2. In step S604, the monitor camera 5a receives, for example, a message to detect a monitor camera according to the plug and play protocol. In step S605, the monitor camera 5a returns a reply by use of an IP address assigned to the monitor camera 5a.

In step S701, each of the monitor cameras 5b to 5d similarly receives a message to detect the monitor camera according to the plug and play protocol. In step S702, the monitor camera returns a reply by use of an IP address assigned thereto.

In step S503, for each of the monitor cameras 5a to 5d, the managing terminal 7 refers to and compares, for example, the IP address information 91 of the information managing table 90 shown in FIG. 9, to thereby determine a new monitor camera 5a and selects an IP address of the monitor camera 5a. Control goes to step S504.

In step S504, the managing terminal 7 sends a video delivery request to the IP address of the monitor camera 5a selected in step S503. In step S606, the monitor camera 5a receives the video delivery request to deliver a video image currently being presented by the monitor camera 5a to the managing terminal 7. This makes it possible for the managing terminal 7 to refer to the video image delivered from the monitor camera 5a. Control goes to step S505.

In step S505, by using, for example, a video comparing function, the managing terminal 7 compares information of the identifier which is included in the video image to be referred to in step S504 and which is displayed on the screen of the mobile device 4 with information of the identifier which is received via the data network 2 from the mobile device 4 in step S501 and which is stored in the identifier information field 9 of the information managing table 90 shown in FIG. 9. If it is determined as a result that the information pieces of the identifiers match each other, the managing terminal 7 can confirm that the IP address of the monitor camera 5a determined in step S503 corresponds to the positional information received from the mobile device 4 in step S501. Control goes to step S506.

In step S506, the managing terminal 7 establishes a correspondence between the IP address of the monitor camera 5a grasped in step S505 and the positional information indicating the installation position 6a of the monitor camera 5a to additionally store information of the IP address in the IP address information field 91 of the information managing table 90 of FIG. 9. Control goes to step S507.

In step S507, since the IP address of the monitor camera 5a presenting the screen of the mobile device 4 having sent the positional information and the identifier in step S501 and the positional information of the installation position 6a of the monitor camera 5a have been obtained, the managing terminal 7 notifies a termination message via the data network 2 to the mobile device 4 to thereby terminate the processing. In step S405, the mobile device 4 receives the termination message to terminate the processing.

As above, the managing terminal 7 can grasp the correspondence between the positional information of the installation position 6a of the monitor camera 5a and the IP address assigned to the monitor camera 5a. Hence, it is possible to correctly establish a correspondence, for example, between the installation position 6 of each monitor camera 5 and an IP address of the monitor camera 5.

Modified Examples:

In the embodiment, the identifier creating section 302 of the mobile device 4 creates a unique identifier. However, it is also possible that the identifier includes the positional information of the mobile device 4 obtained by the positional information obtaining section 301 of the mobile device 4, the positional information being restorable in the managing terminal 7. In this situation, it is not required for the mobile device 4 to send, by use of the communication section 300, both of the positional information obtained by the positional information obtaining section 301 and the identifier created by the identifier creating section 302 via the data network 2 to the managing terminal 7. It is necessary to send only the identifier to the managing terminal 7. In this situation, it is required for the managing terminal 7 to include a function to restore the positional information of the mobile device 4 contained in the identifier received from the mobile device 4. Hence, the amount of data to be communicated between the mobile device 4 and the managing terminal 7 can be reduced.

In step S503 of the managing terminal processing 500 in the managing terminal 7, one IP address of the additionally detected monitor camera 5 is selected to execute processing in steps S504 and S505. However, the processing may be executed as below. In step S503, the managing terminal 7 selects IP addresses of all monitor cameras 5 additionally detected. In step S504, the managing terminal 7 receives video images delivered from the monitor cameras 5 and refers to the video images at the same time. In step S505, the managing terminal 7 compares the identifier information obtained in step S501 with the identifiers displayed on the screen of the mobile device 4, the identifiers being included in the video images received from the monitor cameras 5. If the managing terminal 7 includes a function to refer to the video images from a plurality of monitor cameras 5 at the same time, the managing terminal processing 500 can be completely executed in a shorter period of time when compared with the situation in which the processing of steps S503 to S505 is repeatedly executed for each of the monitor cameras 5. As above, according to the technique described in conjunction with the example, the installation operator can install a desired monitor camera at a particular monitor camera installation position without conducting, for example, an operation to set an address. On the manager side, the correspondence between the IP address assigned to each monitor camera and the installation position of the monitor camera can be obtained without conducting, for example, any prior setting operation for the address setting. Therefore, it is easily possible to construct a monitor camera system, to update the monitor camera system, to additionally construct a monitor camera system, and to expand the monitor camera system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system comprising a managing terminal, a mobile device coupled via a first network or a second network with the managing terminal, and cameras coupled via the first network with the managing terminal, wherein:

the mobile device is configured to send, when the mobile device is near one of the cameras, acquired positional information and an identifier of the mobile device uniquely created by the mobile device via the network to the managing terminal and display information indicating the identifier in the form of a video image;

the camera is configured to shoot the video image being displayed by the mobile device and including the information indicating the identifier to create a second video image including the information, and send the second video image including the information indicating the identifier via the first network to the managing terminal; and the managing terminal is configured to receive the second video image sent from the camera, extract the identifier from the second video image and store, if the extracted identifier matches the identifier sent from the mobile device, an IP address assigned to the camera and the positional information in association with each other, into a storage.

2. The system as claimed in claim 1, wherein the positional information is more specifically geographical positional information.

3. The system as claimed in claim 1, wherein the positional information is more specifically geographical positional information including latitudinal and longitudinal coordinates.

4. A processor-implemented system construction method of constructing a system comprising a managing terminal, a mobile device coupled via a first network or a second network with the managing terminal, and cameras coupled via the first network with the managing terminal, the processor-implemented system construction method being implemented by a processor, to effect operations comprising:

by the mobile device, when the mobile device is near one of the cameras, acquired positional information and an identifier of the mobile device uniquely created by the mobile device are sent via the first or second network to the managing terminal and information indicating the identifier is displayed in the form of a video image on the mobile device;

by the camera, the video image being displayed on the mobile device and including the information indicating the identifier to create a second video image including the information is shot, and the second video image is sent via the first network to the managing terminal; and by the managing terminal, the second video image sent from the camera is received, the identifier from the second video image is extracted, and if the extracted identifier matches the identifier sent from the mobile device, the IP address of the camera and the positional information are stored in association with each other, into a storage.

5. The processor-implemented system construction method as claimed in claim 4, wherein the positional information is more specifically geographical positional information.

6. The processor-implemented system construction method as claimed in claim 4, wherein the positional information is more specifically geographical positional information including latitudinal and longitudinal coordinates.

7. A managing terminal coupled via a first network or a second network with a mobile device and cameras, comprising:

a control section;

a communication section; and a storage for storing information, wherein:

the communication section receives, via the first or second network, positional information and an identifier of the mobile device uniquely created by the mobile device, which are sent from the mobile device when the mobile device is near one of the cameras, and also receives via the first network a video image which is sent from the camera and which includes information indicating the identifier; and the control section extracts the identifier from the video image, and stores into the storage, if the extracted identifier matches the identifier sent from the mobile device, an IP address of the camera and the positional information, in association with each other.

8. The managing terminal as claimed in claim 7, wherein the positional information is more specifically geographical positional information.

9. The managing terminal as claimed in claim 7, wherein the positional information is more specifically geographical positional information including latitudinal and longitudinal coordinates.

10. A non-transitory computer-readable storage medium embodying a program which is executable on a computer coupled via a first network or a second network with a mobile device and cameras, wherein the program makes a managing terminal execute the processing of:
- receiving via the first network or second network, positional information and an identifier of the mobile device uniquely created by the mobile device, which are sent from the mobile device when the mobile device is near one of the cameras;
- receiving via the first network a video image which is sent from the camera and which includes information indicating the identifier;
- extracting the identifier from the video imaged received from the camera;
- storing, if the extracted identifier matches the identifier sent from the mobile device, an IP address of the camera and the positional information in association with each other, into a storage.

11. The non-transitory computer-readable storage medium as claimed in claim 10, wherein the positional information is more specifically geographical positional information.

12. The non-transitory computer-readable storage medium as claimed in claim 10, wherein the positional information is more specifically geographical positional information including latitudinal and longitudinal coordinates.

* * * * *